(12) United States Patent
Lee et al.

(10) Patent No.: US 12,432,436 B2
(45) Date of Patent: Sep. 30, 2025

(54) ELECTRONIC DEVICE INCLUDING UNDER DISPLAY CAMERA AND OPERATING METHOD THEREOF

(71) Applicant: SAMSUNG ELECTRONICS CO., LTD., Suwon-si (KR)

(72) Inventors: Jaemyung Lee, Suwon-si (KR); Jaehyoung Park, Suwon-si (KR); Jonghoon Won, Suwon-si (KR); Sangyong Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/098,398

(22) Filed: Jan. 18, 2023

(65) Prior Publication Data

US 2023/0199294 A1 Jun. 22, 2023

Related U.S. Application Data

(63) Continuation of application No. PCT/KR2022/020599, filed on Dec. 16, 2022.

(30) Foreign Application Priority Data

Dec. 17, 2021 (KR) .................. 10-2021-0181802

(51) Int. Cl.
*H04N 23/57* (2023.01)
*G02B 5/20* (2006.01)
*G06T 3/4053* (2024.01)

(52) U.S. Cl.
CPC ............. *H04N 23/57* (2023.01); *G02B 5/201* (2013.01); *G06T 3/4053* (2013.01)

(58) Field of Classification Search
CPC ...... H04N 23/45; H04N 23/57; H04N 5/3179; H04N 5/265; H04N 5/2257; H04N 5/2258; G06T 3/4053; G02B 5/201
See application file for complete search history.

(56) References Cited

U.S. PATENT DOCUMENTS 9,961,272 B2 5/2018 Lee et al.
10,965,871 B2 3/2021 Song et al.
11,195,304 B2 12/2021 Kim et al.
(Continued)

FOREIGN PATENT DOCUMENTS

CN 111489694 8/2020
CN 111725285 9/2020
(Continued)

OTHER PUBLICATIONS

Search Report and Written Opinion dated Mar. 21, 2023 issued in International Patent Application No. PCT/KR2022/020599.

*Primary Examiner* — Xi Wang
(74) *Attorney, Agent, or Firm* — Nixon & Vanderhye, P.C.

(57) ABSTRACT

An electronic device according to an embodiment may include: a display and a camera module including at least one camera disposed under the display and configured to obtain an image of light having passed through the display wherein the camera module may include a first image sensor including monochrome pixels in a first grid pattern and a second image sensor including a color filter array including a plurality of color filters in a second grid pattern, and the second grid pattern may form a specified angle with the first grid pattern.

19 Claims, 13 Drawing Sheets

(56) References Cited

U.S. PATENT DOCUMENTS

| | | |
|---|---|---|
| 11,527,096 B2 | 12/2022 | Kim et al. |
| 11,575,865 B2 | 2/2023 | Liu et al. |
| 11,812,123 B2 | 11/2023 | Kim et al. |
| 2012/0106840 A1* | 5/2012 | Singhal ................ H04N 23/843 382/167 |
| 2017/0318273 A1* | 11/2017 | Mantzel ................ H04N 23/80 |
| 2019/0280075 A1* | 9/2019 | Chung ............... H10K 59/8731 |
| 2020/0244854 A1* | 7/2020 | Lee ........................ H04N 23/45 |
| 2021/0368081 A1* | 11/2021 | Kim ........................ H04N 23/45 |

FOREIGN PATENT DOCUMENTS

| | | |
|---|---|---|
| KR | 10-2016-0137289 | 11/2016 |
| KR | 10-2019-0088644 | 7/2019 |
| KR | 10-2021-0120682 | 10/2021 |
| KR | 10-2021-0143063 | 11/2021 |

\* cited by examiner

ELECTRONIC DEVICE INCLUDING UNDER DISPLAY CAMERA AND OPERATING METHOD THEREOF

CROSS-REFERENCE TO RELATED APPLICATIONS

This application is a continuation of International Application No. PCT/KR2022/020599 designating the United States, filed on Dec. 16, 2022, in the Korean Intellectual Property Receiving Office and claiming priority to Korean Patent Application No. 10-2021-0181802, filed on Dec. 17, 2021, in the Korean Intellectual Property Office, the disclosures of which are incorporated by reference herein in their entireties.

BACKGROUND

Field

The disclosure relates to an electronic device including an under-display camera, and a method for operating the same.

Description of Related Art

Full front displays have become commercially available, each having an expanded active area such that most of the front surface of the electronic device includes the active area of the display. As a result, under-display camera (UDC) technology has been developed such that a front camera can be disposed under the display, and the area occupied by a conventional front camera can also be used as the display. An electronic device including an under-display camera may capture images using light passing through a display panel and a camera module lens.

When an electronic device includes an under-display camera, the quality of images acquired by the camera may be degraded by pattern characteristics of the display panel. For example, the display panel pattern may diffract or scatter light, and some frequency band components may be attenuated, thereby degrading image quality. Alternatively, when a light source is photographed, the display panel pattern may cause grating diffraction which may cause blurry light, and reflective flare of the grating may degrade image quality. The electronic device may compensate for the image quality of the under-display camera using a software-based scheme such as signal processing or deep learning. However, if the level of signal attenuation is high in this case as well, it may be difficult to restore lost frequency components, and there may be a problem in that the degraded image quality cannot be fully compensated for.

The camera is disposed under the display having a bottom metal layer (BML) pattern in the electronic device, and part of received light is blocked as a result. The characteristics of point spread function (PSF) of the under-display camera (light is diffracted and scattered by BML pattern) degrade modulation transfer function (MTF) characteristics, thereby blurring images and degrading image quality.

SUMMARY

An electronic device according to an example embodiment may include: a display; and a camera module including at least one camera disposed under the display and configured to obtain an image of light having passed through the display, wherein the camera module includes: a first image sensor including monochrome pixels in a first grid pattern; and a second image sensor including a color filter array including a plurality of color filters in a second grid pattern, wherein the second grid pattern forms a specified angle with the first grid pattern.

An electronic device according to an example embodiment may include: a display including a shielding structure comprising at least one shielding layer; and a camera module including at least one camera disposed under the display and configured to obtain an image of light having passed through the display, wherein the camera module includes: a first image sensor including the same type of multiple pixels in a first grid pattern; and a second image sensor including multiple unit pixels in a second grid pattern, the shielding structure includes: a first region having a first display grid pattern at a position corresponding to the first image sensor; and a second region having a second display grid pattern at a position corresponding to the second image sensor, and a first angle formed by the first grid pattern and the first display grid pattern and a second angle formed by the second grid pattern and the second display grid pattern are different from each other.

Various example embodiments disclosed herein are advantageous in that, when a multi-camera is disposed under a display, image sensors are disposed at different angles in a direction less affected by PSF diffraction, thereby improving resolution even in high-frequency areas of images.

Various other advantageous effects identified explicitly or implicitly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with descriptions of the drawings, same or similar reference numerals will be used to refer to same or similar elements.

DETAILED DESCRIPTION

Figure 1:
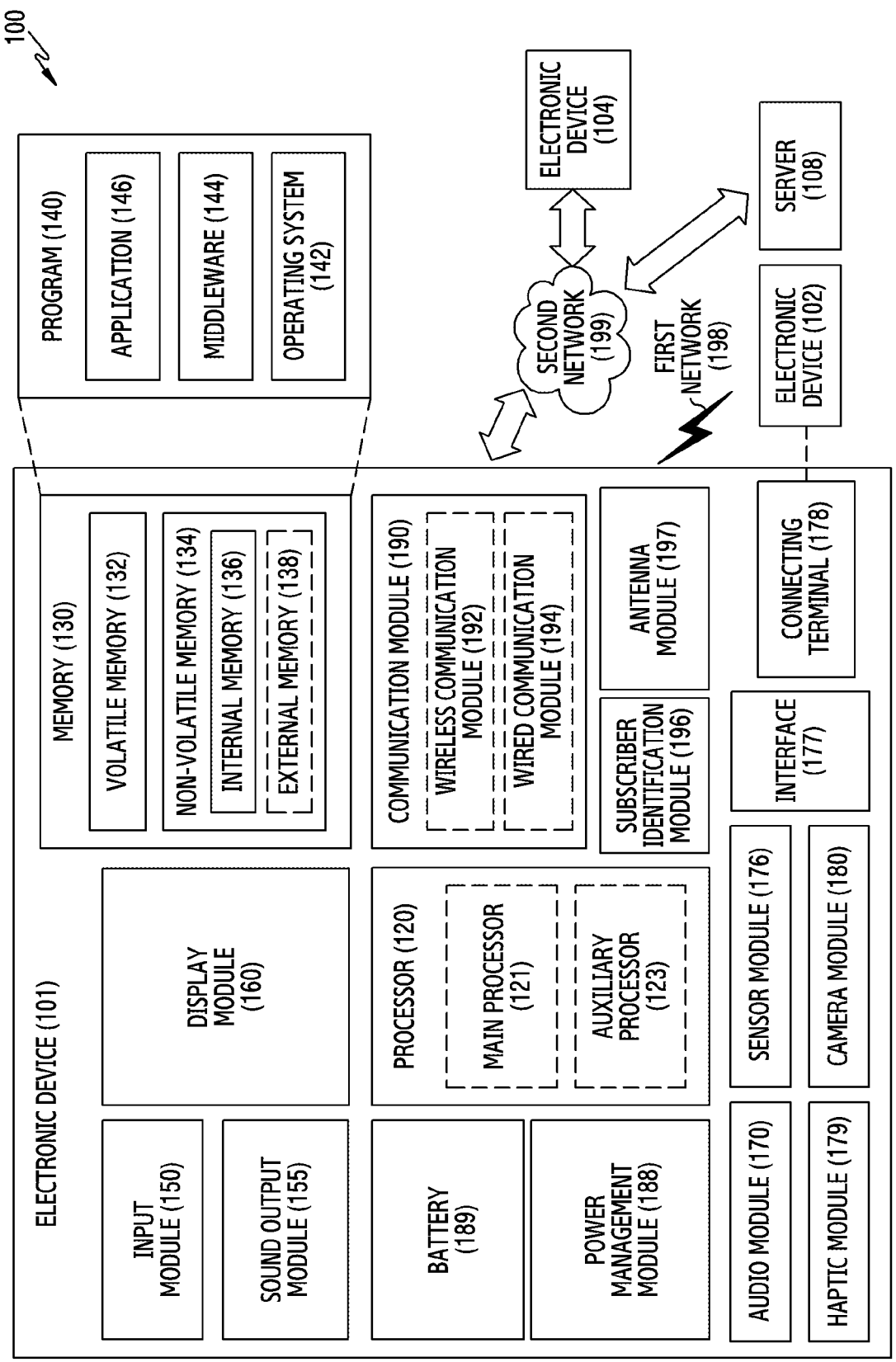
FIG. 1 is a block diagram of illustrating an example electronic device in a network environment according to various embodiments.

FIG. 1 is a block diagram illustrating an example electronic device in a network environment according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
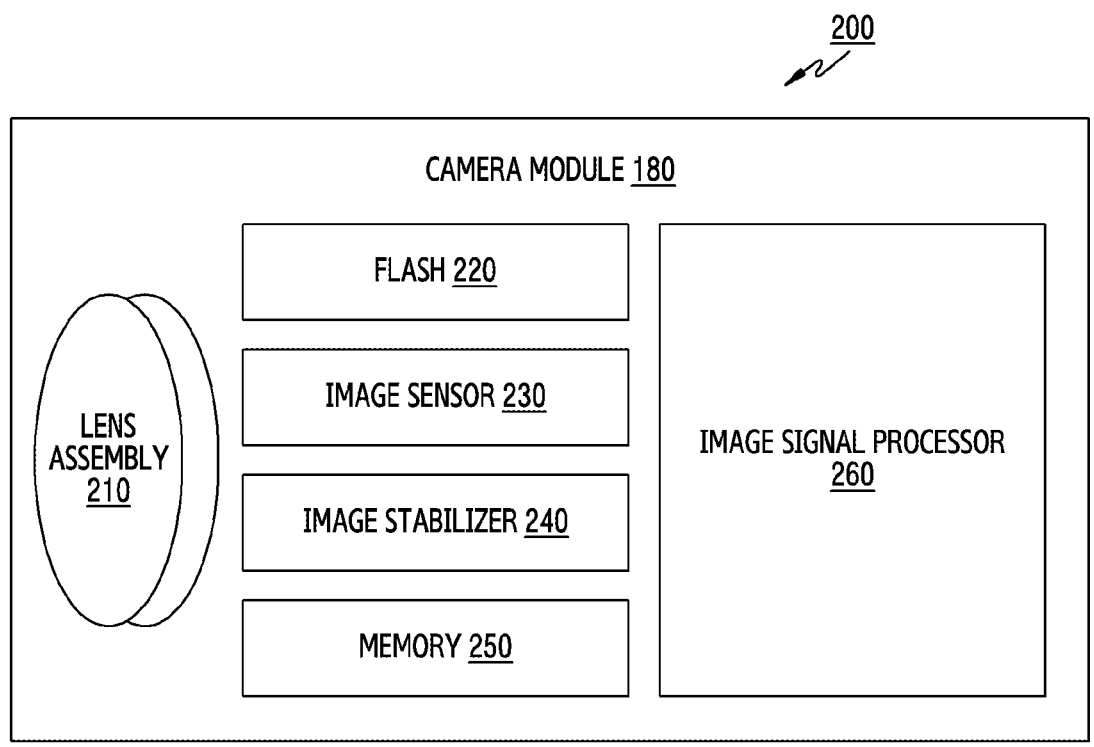
FIG. 2 is a block diagram illustrating an example configuration of a camera module according to various embodiments.

FIG. 2 is a block diagram illustrating an example configuration of a camera module according to various embodiments.

Referring to FIG. 2, the camera module 180 may include a lens assembly 210, a flash 220, an image sensor 230, an image stabilizer 240, memory 250 (e.g., buffer memory), and/or an image signal processor (e.g., including processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various processing circuitry and perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
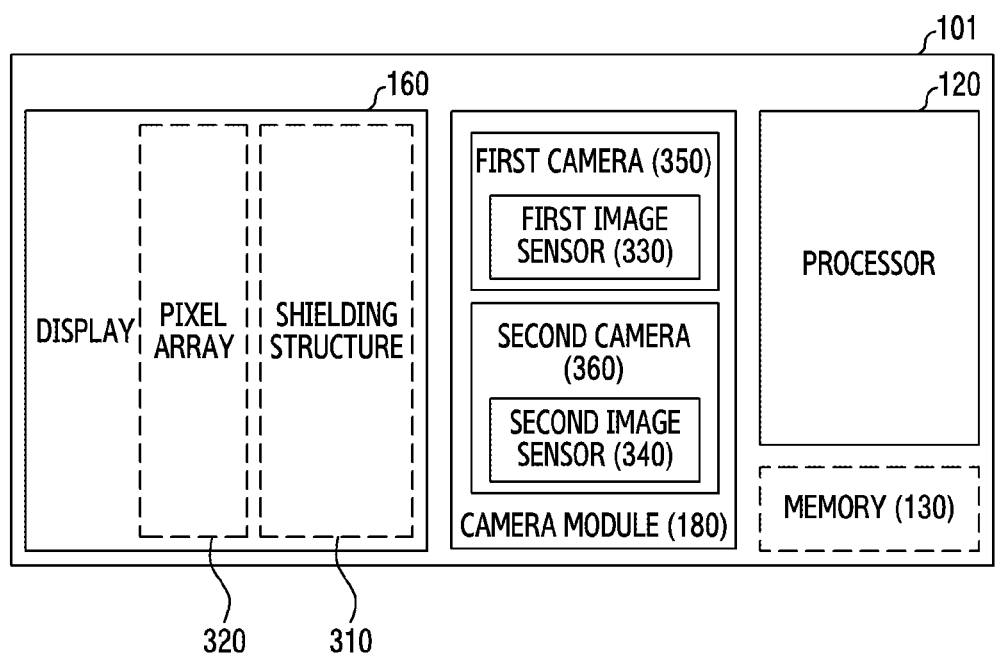
FIG. 3 is a block diagram illustrating an example configuration of an electronic device according to various embodiments.

FIG. 3 is a block diagram illustrating an example configuration of an electronic device 101 according to various embodiments.

An electronic device 101 illustrated in FIG. 3 may be at least partially similar to the electronic device 101 illustrated in FIG. 1 and FIG. 2, and may include an embodiment.

In an embodiment, the electronic device 101 may include a processor (e.g., including processing circuitry) 120, a memory 130, a display 160, and a camera module (e.g., including a camera) 180. In various embodiments, the electronic device 101 may further include additional elements in addition to the elements illustrated in FIG. 3, or at least one of the elements illustrated in FIG. 3 may be omitted from the electronic device 101.

In an embodiment, the processor 120 may be operatively coupled to the memory 130, the display 160, and the camera module 180. For example, the processor 120 may control the memory 130, the display 160, and the camera module 180.

According to an embodiment, the processor 120 may include various processing circuitry and execute calculation or data processing related to control and/or communication of at least one other element of the electronic device 101 using instructions stored in the memory 130. According to an embodiment, the processor 120 may include at least one of a central processing unit (CPU), a graphics processing unit (GPU), a micro-controller unit (MCU), a sensor hub, a supplementary processor, a communication processor, an application processor, an application specific integrated circuit (ASIC), and field programmable gate arrays (FPGAs), and may have multiple cores.

According to an embodiment, the memory 130 may store data associated with operations of the electronic device 101. For example, the memory 130 may store data associated with an image obtained using the camera module 180. For another example, the memory 130 may store data associated with a light source for photographing using the camera module 180.

According to an embodiment, the display 160 may visually provide data to the outside of the electronic device 101. For example, the processor 120 of the electronic device 101 may visually provide image data obtained through the camera module 180 to a user using the display 160.

According to an embodiment, the display 160 may include a pixel layer 320 including multiple display pixels. For example, the display 160 may visually provide image data including color data to an external user using the pixel layer 320.

According to an embodiment, the display 160 may include a shielding structure (e.g., a shielding layer) 310. For example, the display 160 may include the shielding structure 310 having a shape corresponding to the shape of the pixel layer 320.

According to an embodiment, the camera module 180 may include a first camera 350 and a second camera 360. According to an embodiment, the first camera 350 may include a first image sensor 330, and the second camera 360 may include a second image sensor 340.

According to an embodiment, the first image sensor 330 may include the same type of multiple pixels forming a first grid pattern. According to an embodiment, the second image sensor 340 may include multiple unit pixels forming a second grid pattern. According to an embodiment, the unit pixel of the second image sensor 340 may include a first pixel and a second pixel corresponding to color filters different from each other. In an embodiment, a first area occupied by the color of the first pixel and the second area occupied by the color of the second pixel may be different within the unit pixel.

According to an embodiment, the first image sensor 330 may include a mono image sensor configured to obtain a black/white image, and the second image sensor 340 may include an RGB (red, green, and blue) image sensor configured to obtain a color image. In this case, the first image sensor 330 may not include a color filter, and the second image sensor 340 may include a color filter. The first image sensor 330 (e.g., a mono image sensor) may have light-receiving efficiency higher than the RGB image sensor due to not including the color filter. The electronic device 101 may synthesize the image obtained by the first image sensor 330 and the image obtained by the second image sensor 340 (e.g., RGB image sensor) to obtain a color image having excellent quality even in low illumination. For example, the electronic device 101 may obtain a color image and a mono image through the RGB image sensor and the mono image sensor, respectively, and may improve the brightness of the color image, based on the mono image. For example, the electronic device 101 may perform image processing (e.g., image registration or image warping) using the color image and the mono image. In addition, the electronic device 101 may obtain a color image having improved brightness using the color information on a color image and the guidance information through a guided filter of a mono image.

According to an embodiment, the camera module 180 may be disposed under the shielding structure 310. For example, the camera module 180 may be disposed under the shielding structure 310 included in the display 160.

According to an embodiment, the camera module 180 may be disposed to detect an external environment through the display 160. For example, the camera module 180 may be disposed in an internal space of the electronic device 101 so as to be in contact with an external environment through an opening or a permeable region formed in the display 160. The camera module 180 may obtain an image using light having passed through the permeable region of the display 160. According to an embodiment, a region among regions of the display 160, which faces the camera module 180 (or corresponds to the position of the camera module 180), may be formed as a permeable region having designated light transmittance as a part of a region on which content is displayed. For example, a region among regions of the display 160, which faces (or corresponds to) the camera module 180, may be formed to have a high light transmittance (or aperture ratio). According to an embodiment, the permeable region may include a region through which light for forming an image imaged by an image sensor (e.g., the image sensor 230 in FIG. 2) passes and which overlaps an effective region (e.g., a view angle region) of a part of the camera module 180. For example, the permeable region of the display 160 may include a region having a lower pixel density and/or a lower wire density than the perimeter thereof. For example, the permeable region may replace the above-described opening. For example, a part of the camera module 180 may include an under-display camera (UDC).

Figure 4:
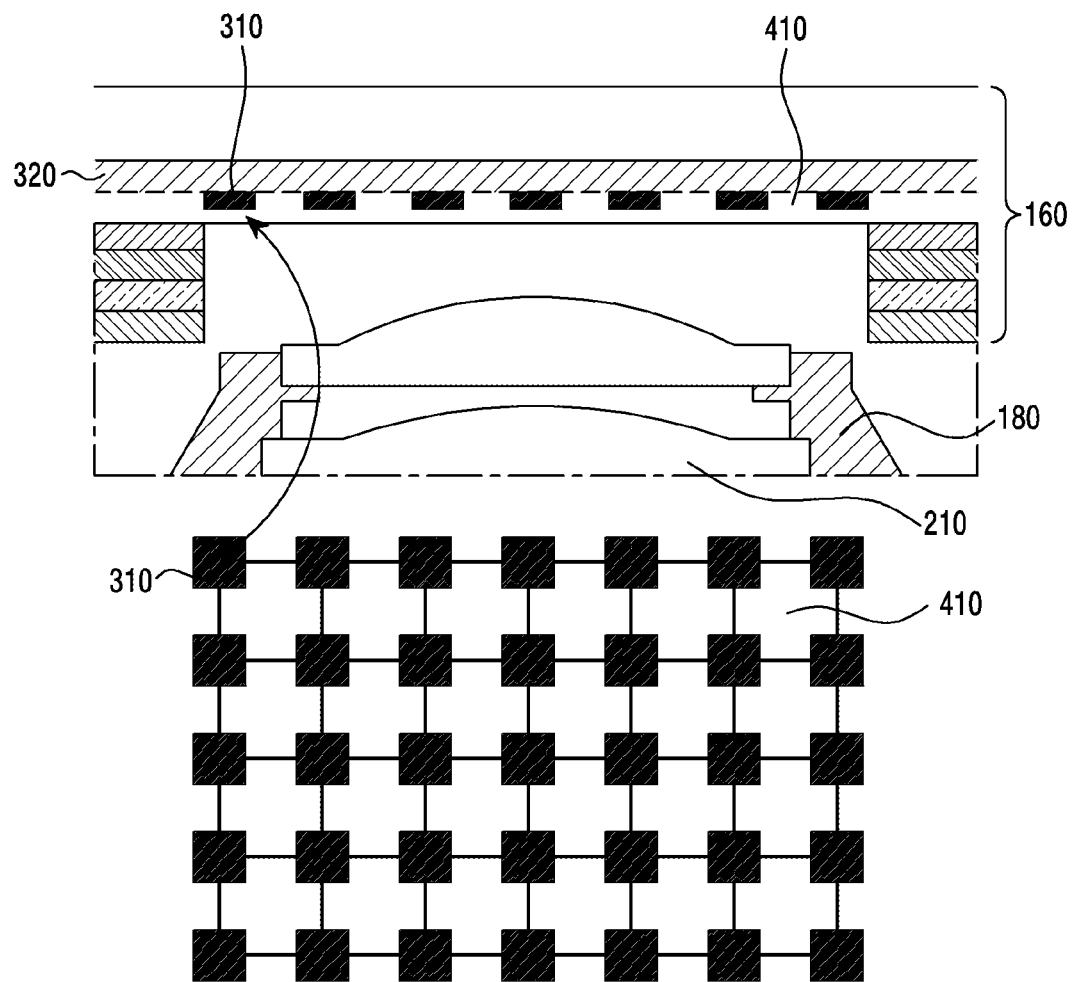
FIG. 4 is a diagram illustrating an example shielding structure included in an electronic device according to various embodiments.

FIG. 4 is a diagram illustrating a part facing a camera module 180 of a shielding structure (e.g., shielding layer) 310 included in an electronic device (e.g., the electronic device 101 in FIG. 3) according to various embodiments.

Referring to FIG. 4, the display 160 according to an embodiment may have the pixel layer 320 disposed in a region on which a screen is displayed in order to visually provide image data to a user. For example, the electronic device 101 may visually provide image data to a user through a screen region of the display 160, which corresponds to the pixel layer 320.

According to an embodiment, the shielding structure 310 may be disposed under the pixel layer 320. In an embodiment, the shielding structure 310 may have a shape and/or a pattern corresponding to the shape and/or the pattern of the pixel layer 320.

According to an embodiment, the shielding structure 310 may include an opaque metal layer including a designated pattern. The designated pattern may correspond to the positions of display pixels included in the pixel layer 320 and the positions of wires connecting the display pixels. For example, the shielding structure 310 may include an opaque metal layer having a pattern corresponding to the shape (e.g., a quadrilateral shape) of a display pixel and the shape of the connection wires. For example, the pixel layer 320 may have a pattern in which display pixels having a quadrilateral shape and holes between the display pixels are repeated. In this case, the shielding structure 310 may also have a structure of a pattern in which quadrilateral shapes and holes 410 are repeated. In addition, the positions of the holes 410 of the shielding structure 310 may correspond to the positions of the holes of the pixel layers 320. For example, the shielding structure 310 and the pixel layer 320 may be formed to share the holes 410.

According to an embodiment, the shielding structure 310 may include an opaque metal layer including a first designated pattern and a transparent layer including a second designated pattern. The first designated pattern may correspond to the positions of the display pixels included in the pixel layer 320. The second designated pattern may correspond to the positions of the wires connecting the display pixels included in the pixel layer 320. For example, the shielding structure 310 may include an opaque metal layer corresponding to the shape (e.g., a quadrilateral shape) of the display pixels, and a transparent layer corresponding to the shape of the wires connecting the display pixels.

According to an embodiment, the pattern of the shielding structure 310 may be formed in a region in which at least a layer (e.g., a protective layer) of the display 160 are removed for the arrangement of the camera module 180. In an embodiment, the shielding structure 310 may be a structure in which holes (e.g., the holes 410) are formed through a layer (e.g., a protective layer) of the display 160. In an embodiment, the shielding structure 310 may be formed to include holes (e.g., the holes 410). According to an embodiment, the shielding structure 310 may include a metal material, and may be formed under the pixel layer 320 by a deposition and/or a patterning method. The shielding structure 310 may protect a pixel and block light emitted from the pixel. According to an embodiment, the shielding structure 310 may include a designated pattern (a black matrix) for reducing diffraction of light introduced into the camera module 180, or an opaque metal layer (e.g., a buffer layer or a bottom metal layer (BML)) including designated patterns.

In an embodiment, the camera module 180 may be disposed under the shielding structure 310. For example, the camera module 180 may be disposed under the shielding structure 310 included in the display 160.

In an embodiment, light from an external light source may pass through at least a part of the display 160 and then be incident into a lens assembly 210 of the camera module 180. For example, light from an external light source may pass through the pixel layer 320 and the shielding structure 310 included in the display 160 and then be incident into the lens assembly 210.

According to an embodiment, FIG. 4 merely shows an example of a UDC display, and the UDC display is not limited thereto and may include various shapes or structures.

Figure 5A:
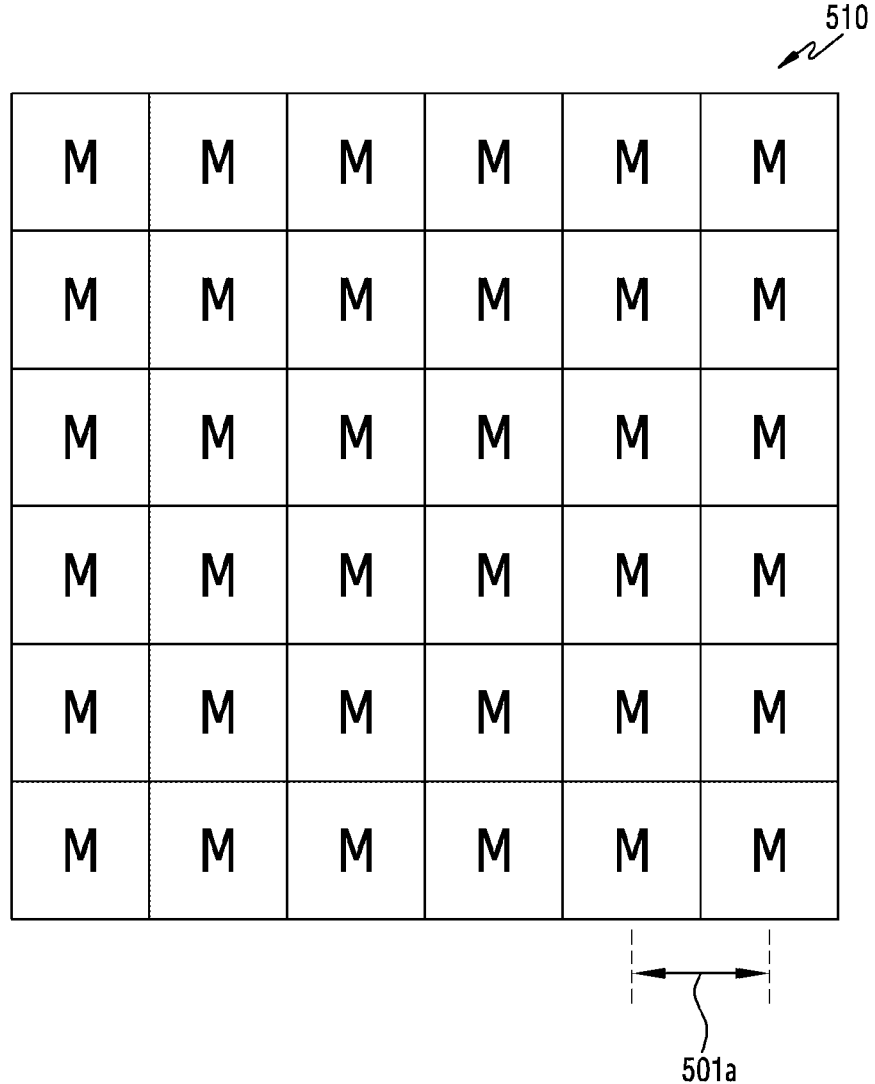
FIG. 5A is a diagram illustrating an example pixel array of a first image sensor of an electronic device according to various embodiments.
Figure 5B:
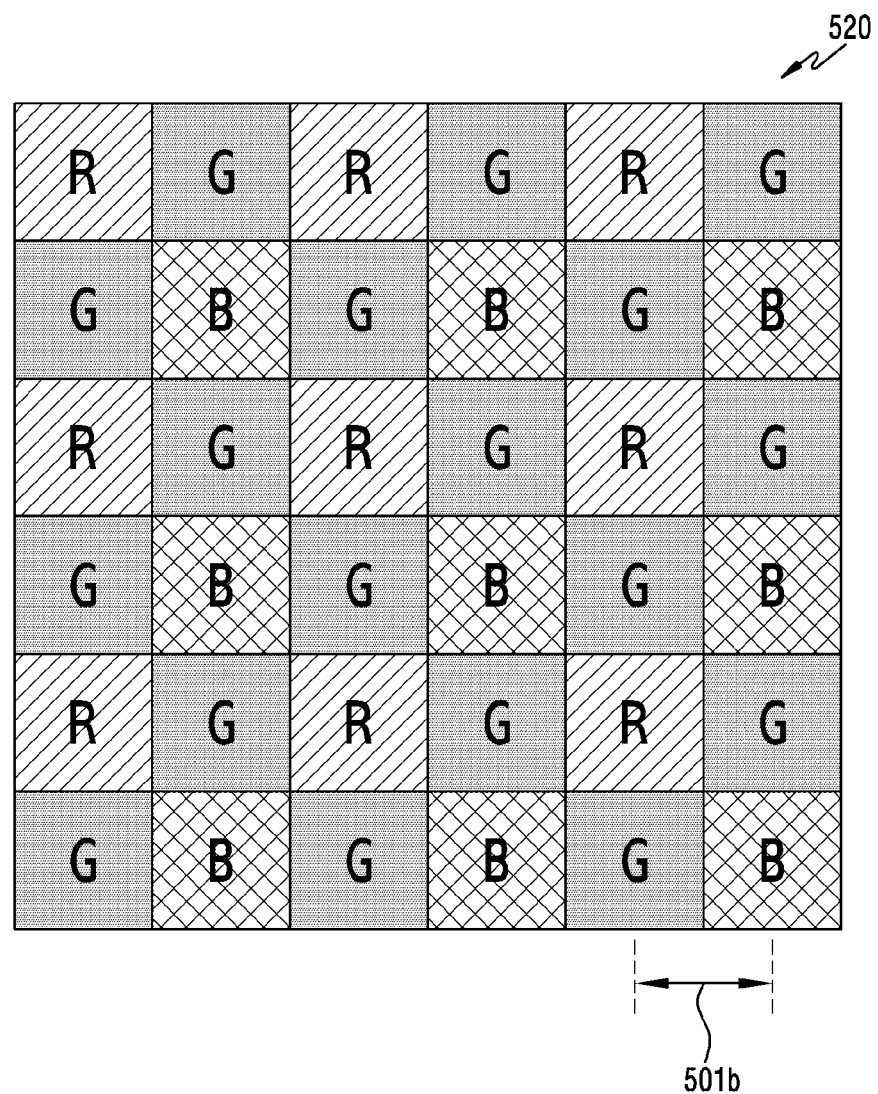
FIG. 5B is a diagram illustrating an example pixel array of a second image sensor of an electronic device according to various embodiments.

FIG. 5A is a diagram illustrating an example pixel array of a first image sensor of an electronic device according to various embodiments. FIG. 5B is a diagram illustrating an example pixel array of a second image sensor of an electronic device according to various embodiments.

Referring to FIG. 5A and FIG. 5B, a first pixel array 510 of a first image sensor (e.g., the first image sensor 330 in FIG. 3) and a second pixel array 520 of a second image sensor (e.g., the second image sensor 340 of FIG. 3) may include multiple photo-sensing elements. For example, the first pixel array 510 and the second pixel array 520 may include multiple photo diodes. According to an embodiment, each of the multiple photo diodes may output a value corresponding to incident light. According to an embodiment, each of the multiple photo diodes may output a value corresponding to incident light, based on the photoelectric effect. According to an embodiment, each of the multiple photo diodes may output a value corresponding to the intensity (or illumination) of incident light, based on the photoelectric effect. According to an embodiment, each of the multiple photo diodes may generate an electric charge corresponding to the intensity (or illumination) of incident light, based on the photoelectric effect. According to an embodiment, each of the multiple photo diodes may output a current according to the amount of generated electric charge.

Referring to FIG. 5A, the first image sensor 330 may include the first pixel array 510. According to an embodiment, the first pixel array 510 may include multiple monochrome pixels, and one pixel may have a width having a first length 501a. According to an embodiment, the monochrome pixels included in the first pixel array 510 may form a first grid pattern.

Referring to FIG. 5B, the second image sensor 340 may include the second pixel array 520. According to an embodiment, the second pixel array 520 may include multiple color filters, and one color may have a width having a second length 501b. According to an embodiment, the multiple color filters included in the second pixel array 520 may form a second grid pattern (e.g., a Bayer pattern).

According to an embodiment, each of the multiple color filters may allow light having a predesignated (e.g., specified) color (or color channel) to pass therethrough. According to an embodiment, each of the color filter may allow light having one color (e.g., red) among predesignated colors (e.g., red, blue, or green) to pass therethrough according to a predesignated pattern (e.g., a Bayer pattern). According to an embodiment, the color filters may block most of light having a color other than the predesignated color (or color channel).

Figure 6A:
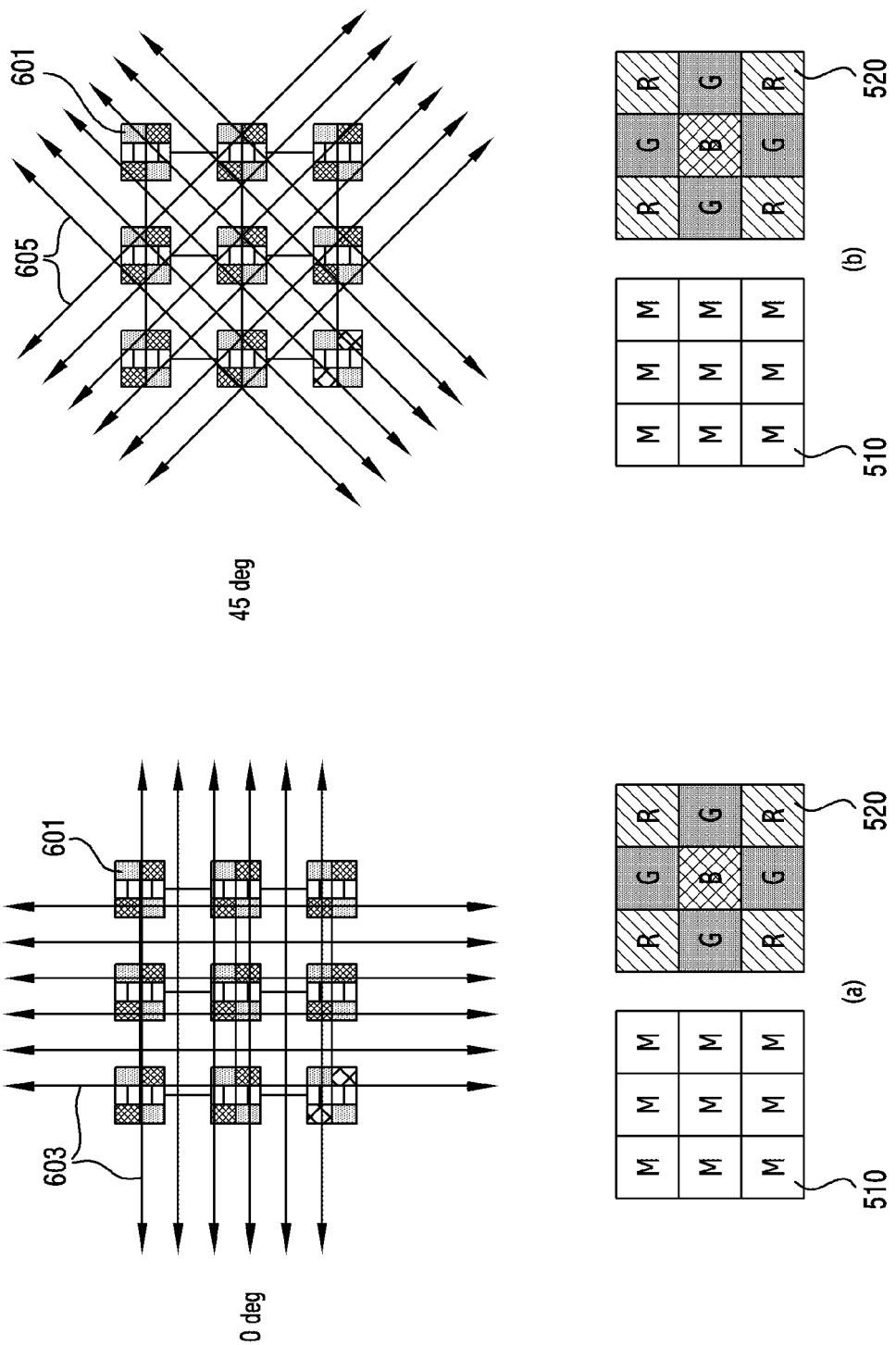
FIG. 6A is a diagram illustrating examples in which a pattern of a shielding structure included in a display and a grid pattern of a pixel array included in an image sensor are arranged while forming a first angle or a second angle in an electronic device according to various embodiments.

FIG. 6A is a diagram illustrating examples in which a pattern of a shielding structure (e.g., the shielding structure 310 in FIG. 3) included in a display (e.g., the display 160 in FIG. 3) and a grid pattern of a pixel array included in an image sensor (e.g., the image sensor 230 in FIG. 2) are arranged while forming a first angle (e.g., 0 degrees) or a second angle (e.g., 45 degrees) in an electronic device according to various embodiments.

Referring to (a) of FIG. 6A, in an electronic device according to an embodiment, a pattern of the shielding structure 310 included in the display 160 and a grid pattern of a pixel array included in an image sensor 230 may be arranged while forming a first angle (e.g., 0 degrees).

According to an embodiment, a first pattern 603 of the shielding structure 310 included in the display 160 may form the first angle (e.g., 0 degrees) with a pattern of a pixel array 601 included in the image sensor 230. For example, the first pattern 603 of the shielding structure 310 may form the first angle with a first grid pattern of the first pixel array 510 included in a first image sensor (e.g., the first image sensor 330 in FIG. 3). In addition, the first pattern 603 of the shielding structure 310 may form the first angle with a second grid pattern of the second pixel array 520 included in a second image sensor (e.g., the second image sensor 340 in FIG. 3).

Referring to (b) of FIG. 6A, in an electronic device according to an embodiment, a pattern of the shielding structure 310 included in the display 160 and a grid pattern of a pixel array included in the image sensor 230 may be arranged while forming a second angle (e.g., 45 degrees).

According to an embodiment, a second pattern 605 of the shielding structure 310 included in the display 160 may form the second angle (e.g., 45 degrees) with a pattern of a pixel array 601 included in the image sensor 230. For example, the second pattern 605 of the shielding structure 310 may form the second angle with the first grid pattern of the first pixel array 510 included in the first image sensor 330. In addition, the second pattern 605 of the shielding structure 310 may form the second angle with the second grid pattern of the second pixel array 520 included in the second image sensor 340.

Figure 6B:
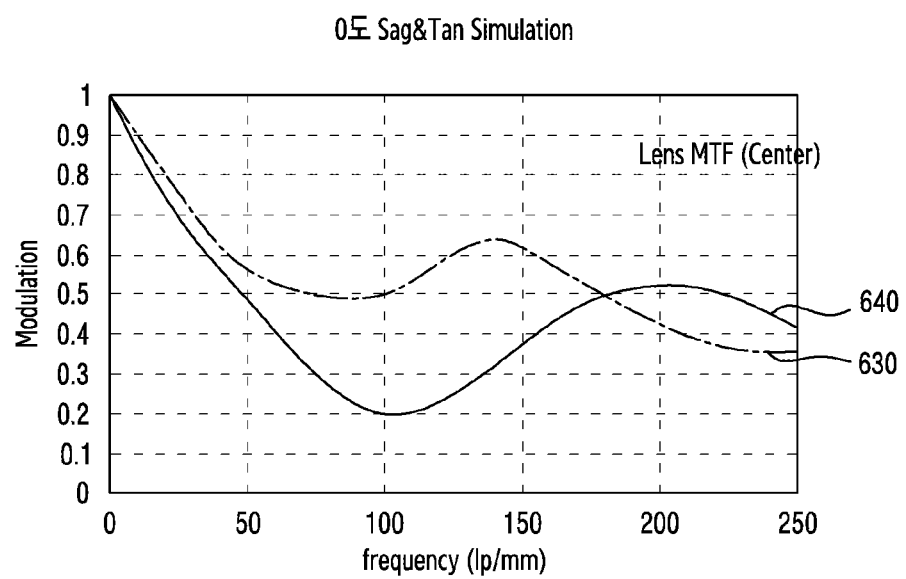
FIG. 6B is a graph illustrating the form of an MTF graph in the case in which a pattern of a shielding structure included in a display and a grid pattern of a pixel array included in an image sensor are arranged while forming the first angle or the second angle in an electronic device according to various embodiments.

FIG. 6B is a graph 620 showing the form of an MTF graph in the case in which a pattern of a shielding structure (e.g., the shielding structure 310 in FIG. 3) included in a display (e.g., the display 160 in FIG. 3) and a grid pattern of a pixel array included in an image sensor (e.g., the image sensor 230 in FIG. 2) are arranged while forming the first angle (e.g., 0 degrees) or the second angle (e.g., 45 degrees) in an electronic device according to various embodiments.

Referring to FIG. 6B, the X-axis represents spatial frequency, and the Y-axis represents the an MTF. Reference numeral 630 in FIG. 6B represents a first MTF in case that the pattern of a shielding structure (e.g., the shielding structure 310 in FIG. 3) and the grid pattern of a pixel array (e.g., the pixel array 601 in FIG. 6A) are arranged while forming the first angle (e.g., 0 degrees). Reference numeral 640 represents a second MTF in case that the pattern of the shielding structure 310 and the grid pattern of the pixel array 601 are arranged while forming the second angle (e.g., degrees).

As illustrated in FIG. 6B, the first MTF 630 may be better than the second MTF 640 in a low frequency (e.g., about 200 lp/mm or less) section. For example, in the low frequency section, the MTF in case that the pattern of the shielding structure 310 and the grid pattern of the pixel array 601 are arranged while forming the first angle (e.g., 0 degrees) may be better than that in case that the pattern of the shielding structure 310 and the grid pattern of the pixel array 601 are arranged while forming the second angle (e.g., 45 degrees).

In addition, the second MTF 640 may be better than the first MTF 630 in a high frequency (e.g., about 200 lp/mm or more) section. For example, in the high frequency section, the MTF in case that the pattern of the shielding structure 310 and the grid pattern of the pixel array 601 are arranged while forming the second angle (e.g., 45 degrees) may be better than that in case that the pattern of the shielding structure 310 and the grid pattern of the pixel array 601 are arranged while forming the first angle (e.g., 0 degrees). A modulation transfer function (MTF) graph may represent resolution/resolution power and contrast of a camera lens. In relation to resolution power of a camera lens, black/white lines, which are alternately displayed, may be referred to as a line pair, and resolution power may be defined as a frequency measured as the line pair per millimeter (line pair (lp)/mm). According to an embodiment, due to a pixel (or pixel a pattern) of a display, the MTF may be different depending on the arrangement direction of a camera (e.g., a UDC) disposed under (e.g., on the rear surface of) the display. Differently from the conventional art in which the MTF decreases as frequency is higher, the MTF in a UDC structure may not decrease as frequency increases, due to diffraction of light, which is generated by the pattern of the shielding structure 310. For example, in the first MTF 630 and/or the second MTF 640, the MTF in case that the frequency is high may be higher than the MTF in case that the frequency is low. Resolution power may refer, for example, to the ability to express such that different objects may be optically distinguished, and may be associated with contrast, definition, or sharpness.

Figure 7:
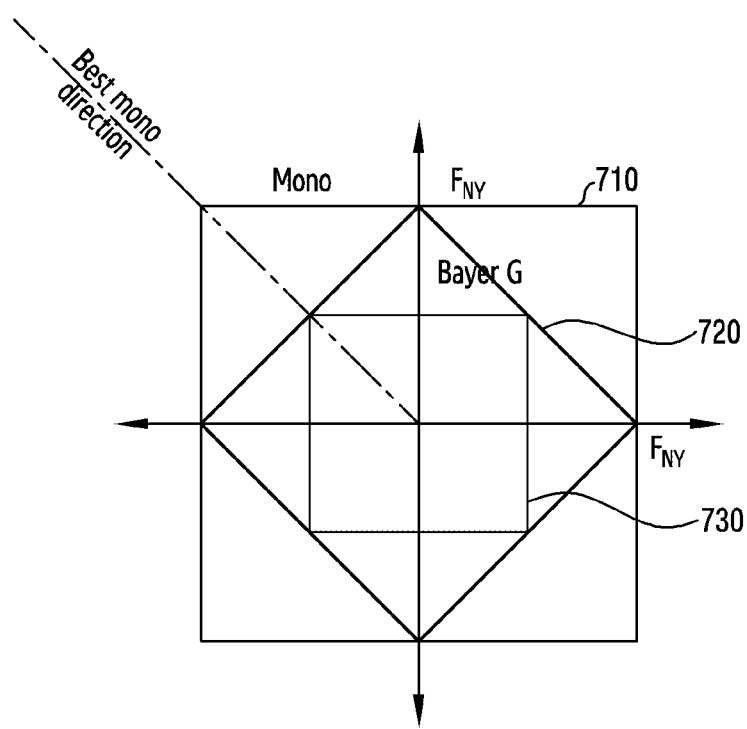
FIG. 7 is a diagram illustrating the Nyquist frequency ranges of a first image sensor and a second image sensor in an electronic device according to various embodiments.

FIG. 7 is a diagram illustrating the Nyquist frequency ranges of a first image sensor (e.g., the first image sensor 330 in FIG. 3) and a second image sensor (e.g., the second image sensor 340 in FIG. 3) in an electronic device according to various embodiments.

Referring to FIG. 7, reference number 710 represents a first range of the Nyquist frequency for expressing black/white in the first image sensor 330 (e.g., a mono image sensor). Reference number 720 represents a second range of the Nyquist frequency for expressing green in the second image sensor 340 (e.g., a Bayer-RGB image sensor). Reference number 730 represents a third range of the Nyquist frequency for expressing red or blue in the second image sensor 340. According to an embodiment, a unit pixel of the second image sensor 340 may include a first pixel (e.g., Gr and Gb) and a second pixel (e.g., R or B) corresponding to color filters different from each other, and the first area occupied by the color of the first pixel and the second area occupied by the color of the second pixel may be different within the unit pixel. For example, within the unit pixel included in the second image sensor 340, the first area corresponding to green may be twice of the second area corresponding to red (or blue). Therefore, the second range indicated by reference number 720 may be wider than the third range indicated by reference number 730. That is, since the first area occupied by green is greater than the second area occupied by red (or blue), within the unit pixel of the second image sensor 340, the second range of the Nyquist frequency for expressing green may be wider than the third range of the Nyquist frequency for expressing red (or blue).

For example, referring to the first range 710, in case that the Nyquist frequency along the X-axis or the Y-axis for expressing black/white in the first image sensor 330 is defined as Fny, the diagonal Nyquist frequency is $2^{1/2}$ times of Fny, and thus may be (1.414×Fny).

In addition, referring to the second range 720, the Nyquist frequency along the X-axis or the Y-axis for expressing green in the second image sensor 340 is Fny, and the diagonal Nyquist frequency is $½^{(1/2)}$ times of Fny and thus may be (0.707×Fny).

In addition, referring to the third range 730, the Nyquist frequency along the X-axis or the Y-axis for expressing blue or red in the second image sensor 340 is (0.5×Fny), and the diagonal Nyquist frequency is $2^{(1/2)}$ times of (0.5×Fny) and thus may be (0.707×Fny).

As illustrated in FIG. 7, the region, which is inside the first range 710 of the Nyquist frequency and also outside the second range 720 of the Nyquist frequency, may be expressed by the first image sensor 330, but may not be expressed by the second image sensor 340. Therefore, in case that the grid pattern of the pixel array included in the first image sensor 330 and the grid pattern of the pixel array included in the second image sensor 340 form a specific angle other than 0 degrees, the expression range of resolution may be increased. For example, referring to the first range 710, since a direction with the largest expression range of resolution is the diagonal direction, in case that the grid pattern of the pixel array included in the first image sensor 330 and the grid pattern of the pixel array included in the second image sensor 340 form 45 degrees, it may be most advantageous in expressing resolution.

Therefore, where two cameras in a UDC include a mono image sensor and an RGB image sensor, respectively, even though the sizes of the pixels or the sizes of the two sensors are the same, since the expression ranges of resolution of the two sensors are different and differences in resolution occur according to the direction of the UDC, it may be advantageous in expressing resolution in case that the grid pattern of the pixel array included in the mono image sensor and the grid pattern of the pixel array included in the RGB image sensor form a specific angle (e.g., 45 degrees). However, in the disclosure, the angle between the grid pattern of the pixel array included in the mono image sensor and the grid pattern of the pixel array included in the RGB image sensor is not limited to 45 degrees.

Figure 8:
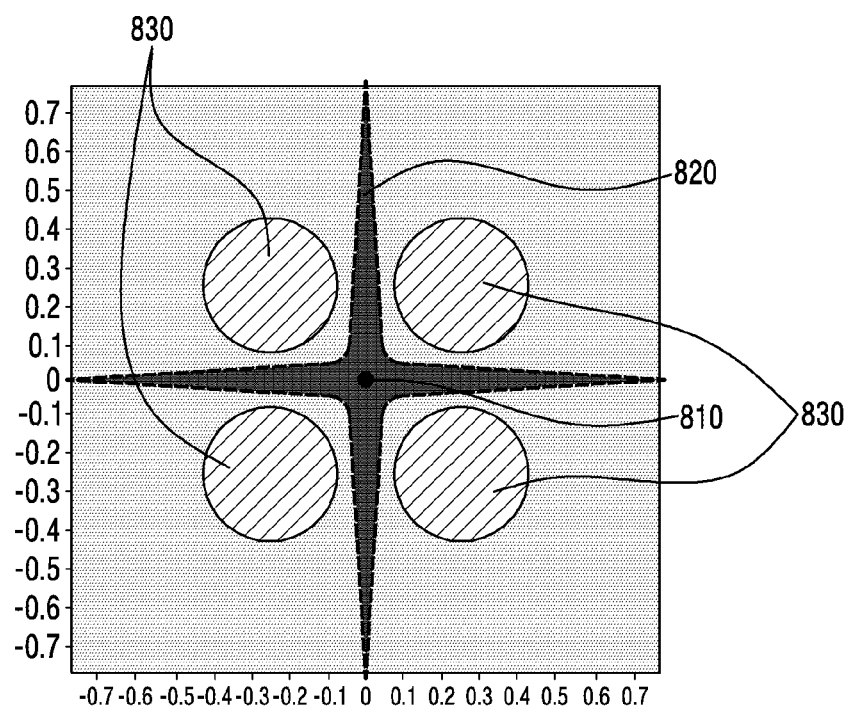
FIG. 8 is a diagram illustrating a PSF characteristic of a UDC in an electronic device according to various embodiments.

FIG. 8 is a diagram illustrating a point spread function (PSF) characteristic of a UDC in an electronic device according to various embodiments.

Referring to FIG. 8, according to an embodiment, a light source image of the light, which is diffracted while passing through a display (e.g., the display 160 in FIG. 3), may include a first region 810 and a second region 820. The first region 810 may be the central region of an airy disk, and the second region 820 may be a diffraction region of a light source. According to an embodiment, the degree of influence of a PSF of diffraction on the second region 820 which is the vertical or the horizontal direction of the first region 810, may be different from the degree of influence of a PSF of diffraction on a third region 830 which is the diagonal direction of the first region 810.

According to an embodiment, based on the direction in which the degree of influence of a PSF of diffraction in a UDC is small and/or the identification of the third region 830, a first image sensor (e.g., the first image sensor 330 in FIG. 3) and a second image sensor (e.g., the second image sensor 340 in FIG. 3) may be arranged to be misaligned from each other in directions in which the degree of influence of the PSF in the UDC is small According to an embodiment, in case that the first image sensor 330 and the second image sensor 340 are arranged in the same direction, the pattern of the BML of a display (e.g., the display 160 in FIG. 3) may be disposed to be oriented in a misaligned direction.

According to an embodiment, where the shielding structure 310 included in the display 160 includes an opaque layer (e.g., an opaque metal layer) corresponding the positions of display pixels and the positions of connection wires, the diffraction described through FIG. 8 may occur, but is not limited thereto. In addition, as described in connection with FIG. 4, even in case that the shielding structure 310 includes an opaque layer (e.g., an opaque metal layer) corresponding to display pixels and a transparent layer corresponding to connection wires, the diffraction described through FIG. 8 may occur. Even in case that the shielding structure 310 includes a transparent layer (e.g., a transparent wire) corresponding to the positions of connection wires, since holes (e.g., the holes 410 in FIG. 4) of the shielding structure 310 and light transmission indices of the transparent layer (or the transparent wire) are different, the diffraction described through FIG. 8 may occur.

Figure 9A:
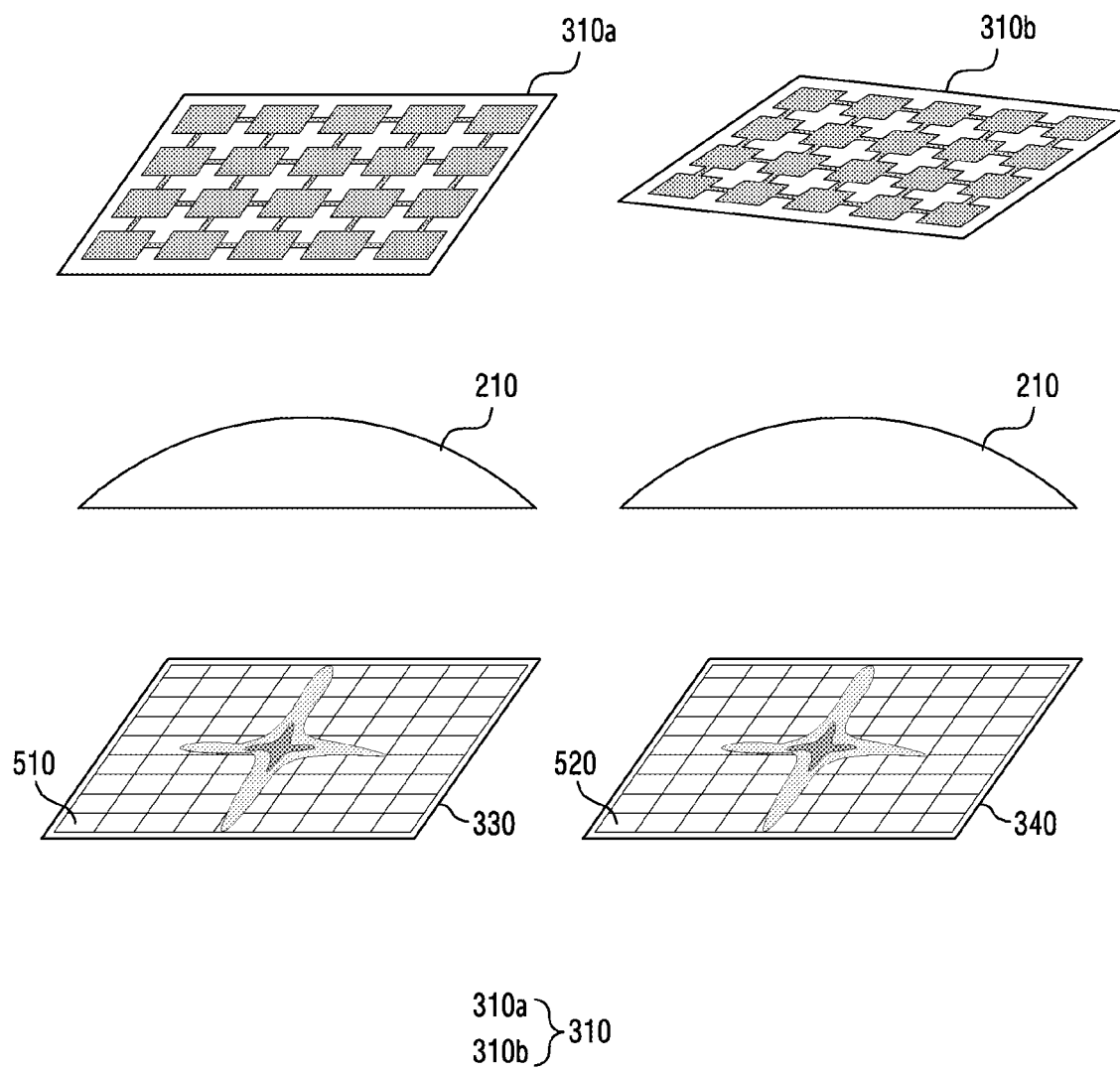
FIG. 9A is a diagram illustrating an example pattern of a shielding structure of a display in the case in which the directions of a grid pattern of a pixel array included in a first image sensor and a grid pattern of a pixel array included in a second image sensor are the same in an electronic device according to various embodiments.
Figure 9B:
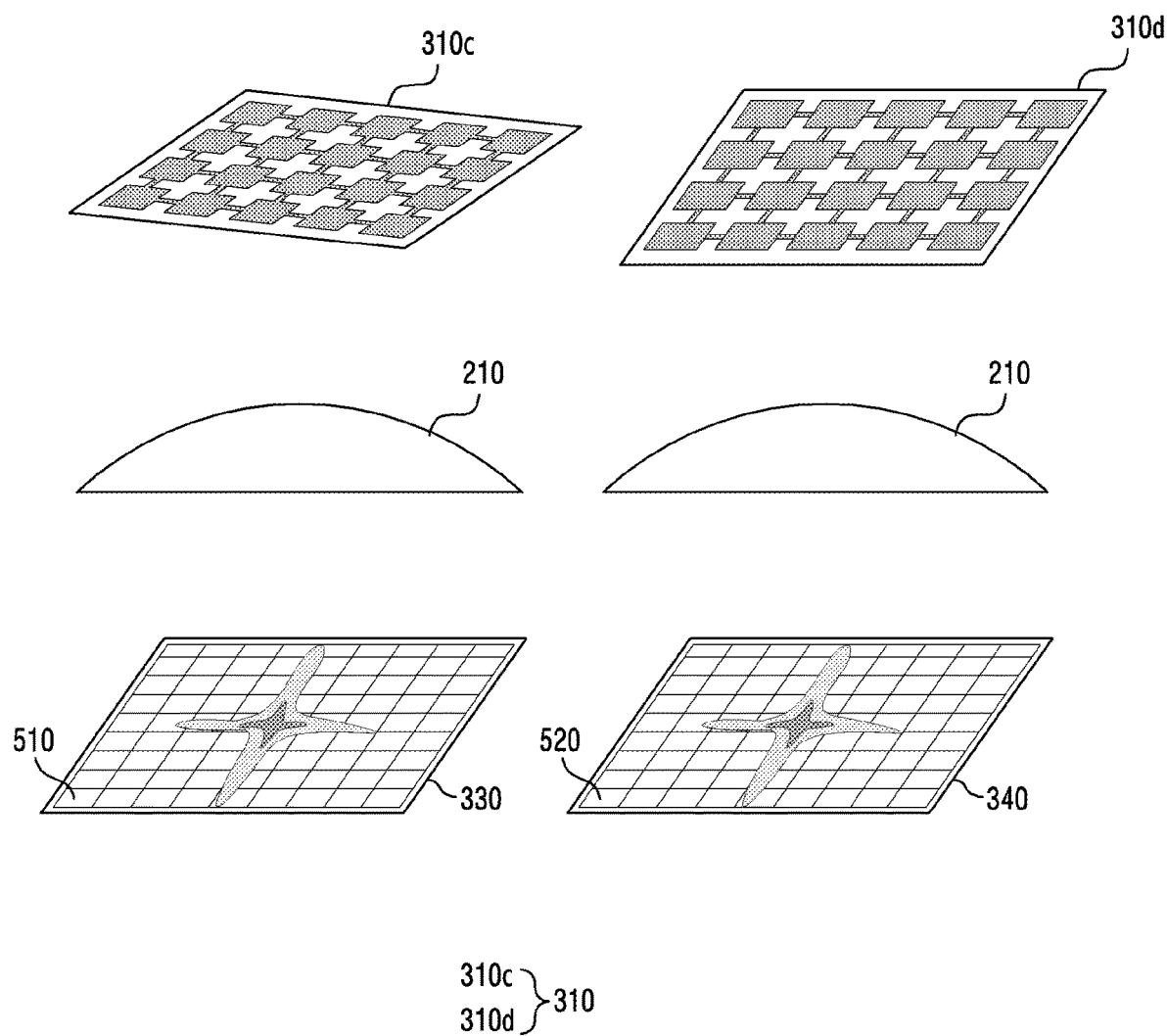
FIG. 9B is a diagram illustrating an example pattern of a shielding structure of a display in the case in which the directions of a grid pattern of a pixel array included in a first image sensor and a grid pattern of a pixel array included in a second image sensor are the same in an electronic device according to various embodiments.

FIG. 9A is a diagram illustrating an example pattern of a shielding structure (e.g., the shielding structure 310 in FIG. 3) of a display (e.g., the display 160 in FIG. 3) in the case in which the directions of a grid pattern of a pixel array included in a first image sensor (e.g., the first image sensor 330 in FIG. 3) and a grid pattern of a pixel array included in a second image sensor (e.g., the second image sensor 340 in FIG. 3) are the same, in an electronic device according to various embodiments. FIG. 9B is a diagram illustrating an example pattern of the shielding structure 310 of the display 160 in the case in which the directions of a grid pattern of a pixel array included in a first image sensor 330 and a grid pattern of a pixel array included in a second image sensor 340 are the same, in an electronic device according to various embodiments.

The pattern of the shielding structure 310 may refer, for example, to a pattern (e.g., a BML pattern) of an opaque metal layer included in the shielding structure 310.

Referring to FIG. 9A and FIG. 9B, the shielding structure 310 may include a designated pattern (a black matrix) for reducing diffraction of light passing through the lens assembly 210, or an opaque metal layer (e.g., a buffer layer or a bottom metal layer (BML)) including designated patterns. According to an embodiment, an image sensor (e.g., the first image sensor 330 and the second image sensor 340) may obtain at least one image, based on light having passed through the lens assembly 210.

Referring to FIG. 9A, in case that a grid pattern of the first pixel array 510 included in the first image sensor 330 and a grid pattern of the second pixel array 520 included in the second image sensor 340 are arranged in the same direction, a pattern of a first shielding structure 310a of the display 160, which is disposed above the first image sensor 330, and a pattern of a second shielding structure 310b of the display 160, which is disposed above the second image sensor 340, may be arranged to form a predetermined (e.g., specified) angle (e.g., 45 degrees). The first shielding structure 310a of the display 160 may be referred to or referred to as a first region of the shielding structure. The first region (or the first shielding structure 310a) of the shielding structure may refer, for example, to a shielding structure disposed at a position corresponding to the first image sensor 330. The second shielding structure 310b of the display 160 may be referred to or referred to as a second region of the shielding structure. The second region (or the second shielding structure 310b) of the shielding structure may refer, for example, to a shielding structure disposed at a position corresponding to the second image sensor 340.

According to an embodiment, in case that monochrome pixels form a first grid pattern in the first image sensor 330, multiple color filters form a second grid pattern in the second image sensor 340, and the first grid pattern and the second grid pattern form 0 degrees, the pattern of the first shielding structure 310a of the display 160 may be disposed to form the first angle (e.g., 0 degrees) with the first grid pattern, and the pattern of the second shielding structure 310b of the display 160 may be disposed to form the second angle (e.g., 45 degrees) with the second grid pattern. The first angle and the second angle may be different. The pattern of the first shielding structure 310a of the display 160 may be referred to as a first display grid pattern. The pattern of the second shielding structure 310b of the display 160 may be referred to as a second display grid pattern.

Referring to FIG. 9B, in case that a grid pattern of the first pixel array 510 included in the first image sensor 330 and a grid pattern of the second pixel array 520 included in the second image sensor 340 are arranged in the same direction, the pattern of a first shielding structure 310c of the display 160, which is disposed above the first image sensor 330, and the pattern of a second shielding structure 310d of the display 160, which is disposed above the second image sensor 340, may be arranged to form a predetermined angle (e.g., 45 degrees).

According to an embodiment, in case that monochrome pixels form a first grid pattern in the first image sensor 330, multiple color filters form a second grid pattern in the second image sensor 340, and the first grid pattern and the second grid pattern form 0 degrees, the pattern of the first shielding structure 310c of the display 160 may be disposed to form the second angle (e.g., 45 degrees) with the first grid pattern, and the pattern of the second shielding structure 310d of the display 160 may be disposed to form the first angle (e.g., 0 degrees) with the second grid pattern.

Figure 10:
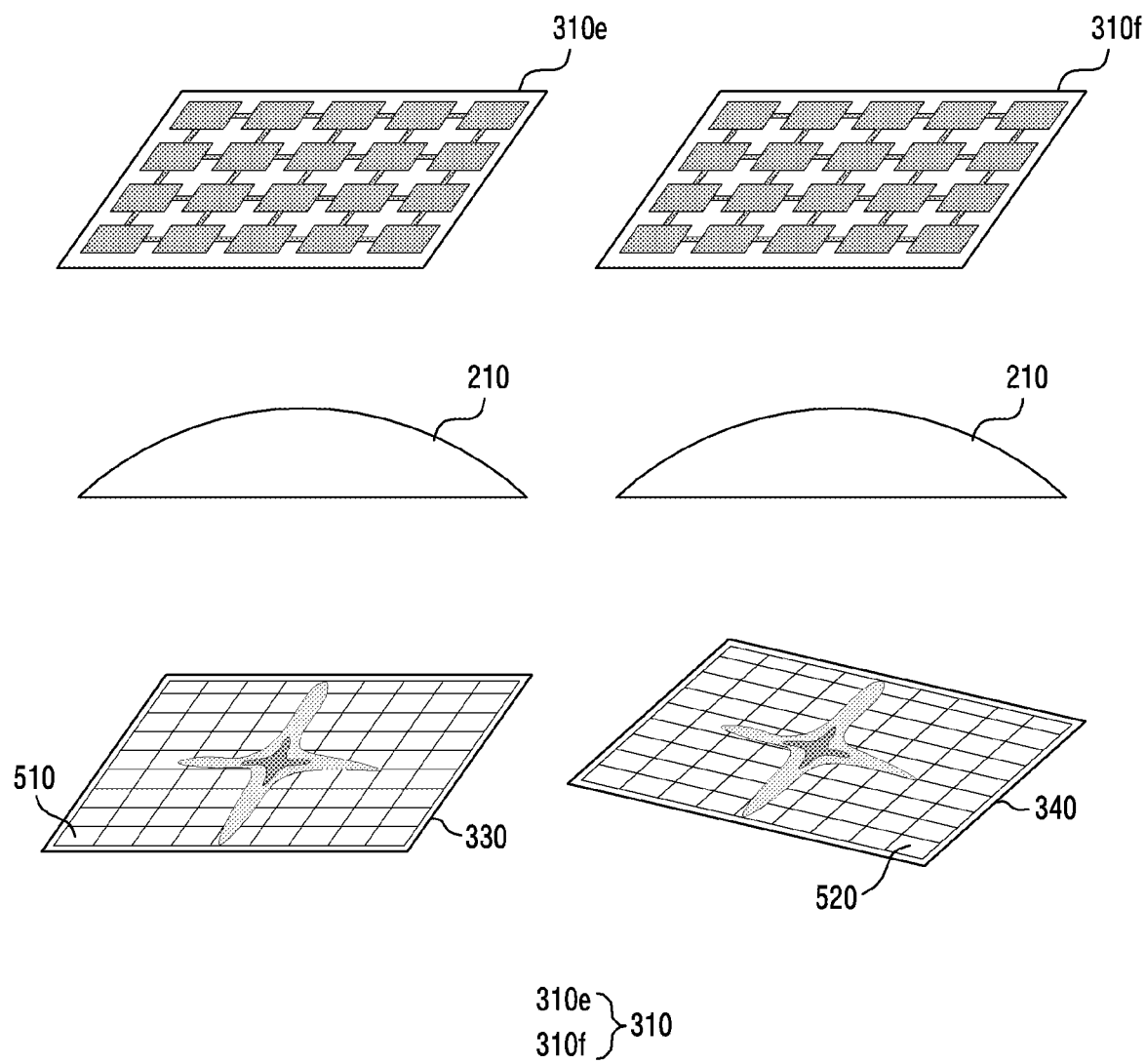
FIG. 10 is a diagram illustrating an example in which the directions of a grid pattern of a pixel array included in a first image sensor and a grid pattern of a pixel array included in a second image sensor are different in an electronic device according to various embodiments.

FIG. 10 is a diagram illustrating an example in which the directions of a grid pattern of a pixel array included in a first image sensor (e.g., the first image sensor 330 in FIG. 3) and a grid pattern of a pixel array included in a second image sensor (e.g., the second image sensor 340 in FIG. 3) are different, in an electronic device according to various embodiments.

Referring to FIG. 10, according to an embodiment, the shielding structure 310 may include a designated pattern (a black matrix) for reducing diffraction of light passing through the lens assembly 210, or an opaque metal layer (e.g., a buffer layer or a bottom metal layer (BML)) including designated patterns. According to an embodiment, an image sensor (e.g., the first image sensor 330 and the second image sensor 340) may obtain at least one image, based on light having passed through the lens assembly 210.

According to an embodiment, in case that monochrome pixels of the first pixel array 510 included in the first image sensor 330 form a first grid pattern and multiple color filters of the second pixel array 520 included in the second image sensor 340 form a second grid pattern, the first grid pattern and the second grid pattern may be arranged to form a predetermined angle. For example, the first grid pattern and the second grid pattern may be arranged to form 45 degrees. However, the angle thereof is not limited to 45 degrees, and the angle formed by the first grid pattern and the second grid pattern may be changed according to the BML pattern of the shielding structure 310.

According to an embodiment, in case that the first grid pattern of the first image sensor 330 and the second grid pattern of the second image sensor 340 are arranged to form a specific angle (e.g., 45 degrees), the pattern of a first shielding structure 310e, which is disposed above the first image sensor 330, and the pattern of a second shielding structure 310f, which is disposed above the second image sensor 340, may be arranged to form 0 degrees.

According to an embodiment, the first angle formed by the first display grid pattern of the first shielding structure 310e (or the first region of the shielding structure) and the first grid pattern of the first image sensor 330 may be different from the second angle formed by the second display grid pattern of the second shielding structure 310f (or the second region of the shielding structure) and the second grid pattern of the second image sensor 340. For example, that a pattern (e.g., a first display grid pattern) of the first shielding structure 310e and the first grid pattern of the first image sensor 330 form 0 degrees and a pattern (e.g., a second display grid) of the second shielding structure 310f and the second grid pattern of the second image sensor 340 form a specific angle (e.g., 45 degrees), is illustrated in FIG. 10, but is merely an embodiment. In addition, various other embodiments are possible. For example, differently from the illustrated FIG. 10, the pattern of the first shielding structure 310e and the first grid pattern of the first image sensor 330 may also be arranged to form a specific angle (e.g., 45 degrees), and the pattern of the second shielding structure 310f and the second grid pattern of the second image sensor 340 may also be arranged to form another specific angle (e.g., 0 degrees).

An electronic device according to an example embodiment may include a display, and a camera module including at least one camera disposed under the display and configured to obtain an image of the light having passed through the display, wherein the camera module may include a first image sensor including monochrome pixels in a first grid pattern and a second image sensor including a color filter array including a plurality of color filters in a second grid pattern, and the second grid pattern may form a specified angle with the first grid pattern.

In an electronic device according to an example embodiment, a unit pixel of the second image sensor may include a first pixel and a second pixel corresponding to color filters different from each other, and a first area occupied by the color of the first pixel and a second area occupied by the color of the second pixel may be different within the unit pixel.

In an electronic device according to an example embodiment, at least one processor electrically connected to the display and the camera module may be further included therein, and the at least one processor may be configured to: obtain a first image from the first image sensor, obtain a second image from the second image sensor, and generate a result image based on the first image and the second image.

In an electronic device according to an example embodiment, a resolution of the resulting image may be higher than a resolution of the first image and a resolution of the second image.

In an electronic device according to an example embodiment, the second grid pattern may form substantially an angle of 45 degrees with the first grid pattern.

In an electronic device according to an example embodiment, the color of each of the plurality of color filters may be at least one of red, green, and blue.

In an electronic device according to an example embodiment, the first area occupied by the color of the first pixel may be greater than the second area occupied by the color of the second pixel.

In an electronic device according to an example embodiment, the color of the first pixel may be green, and the color of the second pixel may be red or blue.

In an electronic device according to an example embodiment, the display may include a pixel layer including multiple display pixels and a shielding structure comprising at least one shielding layer disposed under the pixel layer and having a hole formed therethrough.

In an electronic device according to an example embodiment, the shielding structure may include an opaque metal layer including a designated pattern, and the designated pattern may correspond to at least one of the positions of the display pixels or the positions of wires connecting the display pixels.

In an electronic device according to an example embodiment, the shielding structure may include an opaque metal layer including a first designated pattern and a transparent layer including a second designated pattern, the first designated pattern may correspond to the positions of the display pixels, and the second designated pattern may correspond to the positions of wires connecting the display pixels.

An electronic device according to an example embodiment may include: a display including a shielding structure comprising at least one shielding layer, and a camera module including at least one camera disposed under the display and configured to obtain an image of the light having passed through the display, wherein the camera module may include a first image sensor including a same type of multiple pixels in a first grid pattern, and a second image sensor including multiple unit pixels in a second grid pattern, the shielding structure may include a first region in a first display grid pattern at a position corresponding to the first image sensor, and a second region in a second display grid pattern at a position corresponding to the second image sensor, wherein a first angle formed by the first grid pattern and the first display grid pattern and a second angle formed by the second grid pattern and the second display grid pattern may be different from each other.

In an electronic device according to an example embodiment, the first grid pattern and the second grid pattern may form an angle of substantially 0 degrees, and the first display grid pattern and the second display grid pattern may form an angle of substantially 45 degrees.

In an electronic device according to an example embodiment, the first grid pattern and the second grid pattern may form an angle of substantially 45 degrees, and the first display grid pattern and the second display grid pattern may form an angle of substantially 0 degrees.

In an electronic device according to an example embodiment, the first image sensor may not include a color filter and the second image sensor may include at least one color filter.

In an electronic device according to an example embodiment, a Nyquist frequency of the first image sensor and a Nyquist frequency of the second image sensor may be the same.

In an electronic device according to an example embodiment, the display may include a shielding structure in the first region and a shielding structure in the second region, wherein each of the shielding structures in the first and second regions have display grid patterns different from each other.

In an electronic device according to an example embodiment, the first angle may be 0 degrees and the second angle may be 45 degrees.

In an electronic device according to an example embodiment, the first angle may be 45 degrees and the second angle may be 0 degrees.

In an electronic device according to an example embodiment, the shielding structure of the display may include an opaque metal layer including a specified pattern, and the specified pattern may correspond to at least one of the positions of display pixels or the positions of wires connecting the display pixels.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display; and
    a camera module including at least one camera disposed under the display and configured to obtain an image of light having passed through the display,
    wherein the camera module comprises:
        a first image sensor comprising monochrome pixels in a first grid pattern; and
        a second image sensor comprising a color filter array comprising a plurality of color filters in a second grid pattern, wherein the second grid pattern forms an angle of substantially 45 degrees with the first grid pattern.

2. The electronic device of claim 1, wherein a unit pixel of the second image sensor comprises a first pixel and a second pixel corresponding to color filters different from each other, and
    a first area occupied by a color of the first pixel and a second area occupied by a color of the second pixel are different within the unit pixel.

3. The electronic device of claim 1, further comprising at least one processor, comprising processing circuitry, electrically connected to the display and the camera module,
    wherein the at least one processor is configured to:
        obtain a first image from the first image sensor;
        obtain a second image from the second image sensor; and
        generate a resulting image based on the first image and the second image.

4. The electronic device of claim 3, wherein a resolution of the resulting image is higher than a resolution of the first image and a resolution of the second image.

5. The electronic device of claim 1, wherein a color of each of the plurality of color filters is at least one of red, green, and blue.

6. The electronic device of claim 2, wherein the first area occupied by the color of the first pixel is greater than the second area occupied by the color of the second pixel.

7. The electronic device of claim 2, wherein the color of the first pixel is green, and the color of the second pixel is red or blue.

8. The electronic device of claim 1, wherein the display comprises a pixel layer comprising multiple display pixels, and a shielding structure comprising at least one shielding layer disposed under the pixel layer and having a hole formed therethrough.

9. The electronic device of claim 8, wherein the shielding structure comprises an opaque metal layer comprising a specified pattern, and
    the specified pattern corresponding to at least one of positions of the display pixels or positions of wires connecting the display pixels.

10. The electronic device of claim 8, wherein the shielding structure comprises an opaque metal layer comprising a first specified pattern, and a transparent layer comprising a second specified pattern, wherein
    the first specified pattern corresponds to positions of the display pixels, and
    the second specified pattern corresponds to positions of wires connecting the display pixels.

11. An electronic device comprising:
    a display comprising a shielding structure comprising at least one shielding layer; and a camera module including at least one camera disposed under the display and configured to obtain an image of light having passed through the display, wherein the camera module comprises:
- a first image sensor comprising a same type of multiple pixels in a first grid pattern; and
- a second image sensor comprising multiple unit pixels in a second grid pattern, wherein the shielding structure comprises:
  - a first region having a first display grid pattern at a position corresponding to the first image sensor; and
  - a second region having a second display grid pattern at a position corresponding to the second image sensor, and wherein a first angle formed by the first grid pattern and the first display grid pattern and a second angle formed by the second grid pattern and the second display grid pattern are different from each other.

12. The electronic device of claim 11, wherein the first grid pattern and the second grid pattern form an angle of substantially 0 degrees, and the first display grid pattern and the second display grid pattern form an angle of substantially 45 degrees.

13. The electronic device of claim 11, wherein the first grid pattern and the second grid pattern form an angle of substantially 45 degrees, and the first display grid pattern and the second display grid pattern form an angle of substantially 0 degrees.

14. The electronic device of claim 11, wherein the first image sensor does not comprise a color filter, and the second image sensor comprises at least one color filter.

15. The electronic device of claim 11, wherein a Nyquist frequency of the first image sensor and a Nyquist frequency of the second image sensor are the same.

16. The electronic device of claim 11, wherein the display comprises a shielding structure including at least one shielding layer in the first region and a shielding structure including at least one shielding layer in the second region, each having display grid patterns different from each other.

17. The electronic device of claim 11, wherein the first angle is 0 degrees and the second angle is 45 degrees.

18. The electronic device of claim 11, wherein the first angle is 45 degrees and the second angle is 0 degrees.

19. The electronic device of claim 11, wherein the shielding structure of the display comprises an opaque metal layer comprising a specified pattern, and the specified pattern corresponds to at least one of the positions of display pixels or the positions of wires connecting the display pixels.

* * * * *